United States Patent
Thioux et al.

(10) Patent No.: US 9,355,247 B1
(45) Date of Patent: May 31, 2016

(54) FILE EXTRACTION FROM MEMORY DUMP FOR MALICIOUS CONTENT ANALYSIS

(71) Applicant: FireEye, Inc.

(72) Inventors: Emmanuel Thioux, Milpitas, CA (US); Muhammad Amin, Milpitas, CA (US); Osman Ismael, Milpitas, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

(21) Appl. No.: 13/801,545

(22) Filed: Mar. 13, 2013

(51) Int. Cl.
*G06F 21/55* (2013.01)

(52) U.S. Cl.
CPC ...................................... *G06F 21/55* (2013.01)

(58) Field of Classification Search
CPC ...... G06F 21/53; G06F 21/55; H04L 63/1491
USPC ............................................................. 726/24
See application file for complete search history.

(56) References Cited

U.S. PATENT DOCUMENTS

| | | | |
|---|---|---|---|
| 4,292,580 A | 9/1981 | Ott et al. |
| 5,175,732 A | 12/1992 | Hendel et al. |
| 5,440,723 A | 8/1995 | Arnold et al. |
| 5,490,249 A | 2/1996 | Miller |
| 5,657,473 A | 8/1997 | Killean et al. |
| 5,842,002 A | 11/1998 | Schnurer et al. |
| 5,978,917 A | 11/1999 | Chi |
| 6,088,803 A | 7/2000 | Tso et al. |
| 6,094,677 A | 7/2000 | Capek et al. |
| 6,108,799 A | 8/2000 | Boulay et al. |
| 6,118,382 A | 9/2000 | Hibbs et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack |
| 6,357,008 B1 | 3/2002 | Nachenberg |

(Continued)

FOREIGN PATENT DOCUMENTS

| | | |
|---|---|---|
| GB | 2439806 | 1/2008 |
| GB | 2490431 A | 10/2012 |

(Continued)

OTHER PUBLICATIONS

*IEEE Xplore Digital Library Sear Results for "detection of unknown computer worms"*. Http//ieeexplore.ieee.org/searchresult.jsp?SortField=Score&SortOrder=desc&ResultC . . . , (Accessed on Aug. 28, 2009).

(Continued)

*Primary Examiner* — Joseph P Hirl
*Assistant Examiner* — J. Brant Murphy
(74) *Attorney, Agent, or Firm* — Rutan & Tucker, LLP; William W. Schaal

(57) ABSTRACT

Techniques for malicious content detection using memory dump are described herein. According to one embodiment, a monitoring module is configured to monitor activities of a malicious content suspect executed within a sandboxed operating environment. In response to detection of one or more predetermined events triggered by the malicious content suspect, a memory dump module is configured to generate a memory dump of the malicious content suspect. An analysis module is configured to analyze the memory dump to determine whether the malicious content suspect should be declared as malicious based on a set of one or more rules.

21 Claims, 7 Drawing Sheets

(56) References Cited

U.S. PATENT DOCUMENTS

| | | | |
|---|---|---|---|
| 6,417,774 B1 | 7/2002 | Hibbs et al. | |
| 6,424,627 B1 | 7/2002 | Sorhaug et al. | |
| 6,442,696 B1 | 8/2002 | Wray et al. | |
| 6,484,315 B1 | 11/2002 | Ziese | |
| 6,487,666 B1 | 11/2002 | Shanklin et al. | |
| 6,493,756 B1 | 12/2002 | O'Brien et al. | |
| 6,550,012 B1 | 4/2003 | Villa et al. | |
| 6,700,497 B2 | 3/2004 | Hibbs et al. | |
| 6,775,657 B1 | 8/2004 | Baker | |
| 6,831,893 B1 | 12/2004 | Ben Nun et al. | |
| 6,832,367 B1 | 12/2004 | Choi et al. | |
| 6,895,550 B2 | 5/2005 | Kanchirayappa et al. | |
| 6,898,632 B2 | 5/2005 | Gordy et al. | |
| 6,907,396 B1 | 6/2005 | Muttik et al. | |
| 6,941,348 B2 | 9/2005 | Petry et al. | |
| 6,971,097 B1 | 11/2005 | Wallman | |
| 6,981,279 B1 | 12/2005 | Arnold et al. | |
| 7,007,107 B1 | 2/2006 | Ivchenko et al. | |
| 7,028,179 B2 | 4/2006 | Anderson et al. | |
| 7,043,757 B2 | 5/2006 | Hoefelmeyer et al. | |
| 7,069,316 B1 | 6/2006 | Gryaznov | |
| 7,080,408 B1 | 7/2006 | Pak et al. | |
| 7,093,002 B2 | 8/2006 | Wolff et al. | |
| 7,093,239 B1 * | 8/2006 | van der Made | G06F 21/562 714/38.13 |
| 7,100,201 B2 | 8/2006 | Izatt | |
| 7,159,149 B2 | 1/2007 | Spiegel et al. | |
| 7,213,260 B2 | 5/2007 | Judge | |
| 7,231,667 B2 | 6/2007 | Jordan | |
| 7,240,364 B1 | 7/2007 | Branscomb et al. | |
| 7,240,368 B1 | 7/2007 | Roesch et al. | |
| 7,243,371 B1 | 7/2007 | Kasper et al. | |
| 7,249,175 B1 | 7/2007 | Donaldson | |
| 7,287,278 B2 | 10/2007 | Liang | |
| 7,308,716 B2 | 12/2007 | Danford et al. | |
| 7,328,453 B2 | 2/2008 | Merkle, Jr. et al. | |
| 7,346,486 B2 | 3/2008 | Ivancic et al. | |
| 7,356,736 B2 | 4/2008 | Natvig | |
| 7,386,888 B2 | 6/2008 | Liang et al. | |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham et al. | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,467,408 B1 | 12/2008 | O'Toole, Jr. | |
| 7,478,428 B1 | 1/2009 | Thomlinson | |
| 7,480,773 B1 | 1/2009 | Reed | |
| 7,487,543 B2 | 2/2009 | Arnold et al. | |
| 7,496,960 B1 | 2/2009 | Chen et al. | |
| 7,496,961 B2 | 2/2009 | Zimmer et al. | |
| 7,519,990 B1 | 4/2009 | Xie | |
| 7,523,493 B2 | 4/2009 | Liang et al. | |
| 7,530,104 B1 | 5/2009 | Thrower et al. | |
| 7,540,025 B2 | 5/2009 | Tzadikario | |
| 7,565,550 B2 | 7/2009 | Liang et al. | |
| 7,568,233 B1 * | 7/2009 | Szor et al. | 726/25 |
| 7,584,455 B2 | 9/2009 | Ball | |
| 7,603,715 B2 | 10/2009 | Costa et al. | |
| 7,607,171 B1 | 10/2009 | Marsden et al. | |
| 7,639,714 B2 | 12/2009 | Stolfo et al. | |
| 7,644,441 B2 | 1/2010 | Schmid et al. | |
| 7,657,419 B2 | 2/2010 | van der Made | |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,712,136 B2 | 5/2010 | Sprosts et al. | |
| 7,730,011 B1 | 6/2010 | Deninger et al. | |
| 7,739,740 B1 * | 6/2010 | Nachenberg et al. | 726/25 |
| 7,779,463 B2 | 8/2010 | Stolfo et al. | |
| 7,779,472 B1 * | 8/2010 | Lou | G06F 21/566 726/22 |
| 7,784,097 B1 | 8/2010 | Stolfo et al. | |
| 7,832,008 B1 | 11/2010 | Kraemer | |
| 7,836,502 B1 | 11/2010 | Zhao et al. | |
| 7,849,506 B1 | 12/2010 | Dansey et al. | |
| 7,854,007 B2 | 12/2010 | Sprosts et al. | |
| 7,869,073 B2 | 1/2011 | Oshima | |
| 7,877,803 B2 | 1/2011 | Enstone et al. | |
| 7,904,959 B2 | 3/2011 | Sidiroglou et al. | |
| 7,908,660 B2 | 3/2011 | Bahl | |
| 7,930,738 B1 | 4/2011 | Petersen | |
| 7,937,761 B1 | 5/2011 | Bennett | |
| 7,949,849 B2 | 5/2011 | Lowe et al. | |
| 7,996,556 B2 | 8/2011 | Raghavan et al. | |
| 7,996,836 B1 | 8/2011 | McCorkendale et al. | |
| 7,996,904 B1 * | 8/2011 | Chiueh et al. | 726/24 |
| 7,996,905 B2 | 8/2011 | Arnold et al. | |
| 8,006,305 B2 | 8/2011 | Aziz | |
| 8,010,667 B2 | 8/2011 | Zhang et al. | |
| 8,020,206 B2 | 9/2011 | Hubbard et al. | |
| 8,028,338 B1 | 9/2011 | Schneider et al. | |
| 8,042,184 B1 | 10/2011 | Batenin | |
| 8,045,094 B2 | 10/2011 | Teragawa | |
| 8,045,458 B2 | 10/2011 | Alperovitch et al. | |
| 8,069,484 B2 | 11/2011 | McMillan et al. | |
| 8,087,086 B1 | 12/2011 | Lai et al. | |
| 8,171,553 B2 | 5/2012 | Aziz et al. | |
| 8,176,049 B2 | 5/2012 | Deninger et al. | |
| 8,176,480 B1 | 5/2012 | Spertus | |
| 8,201,246 B1 | 6/2012 | Wu et al. | |
| 8,204,984 B1 | 6/2012 | Aziz et al. | |
| 8,214,905 B1 | 7/2012 | Doukhvalov et al. | |
| 8,220,055 B1 | 7/2012 | Kennedy | |
| 8,225,288 B2 | 7/2012 | Miller et al. | |
| 8,225,373 B2 | 7/2012 | Kraemer | |
| 8,233,882 B2 | 7/2012 | Rogel | |
| 8,234,640 B1 * | 7/2012 | Fitzgerald et al. | 718/1 |
| 8,234,709 B2 | 7/2012 | Viljoen et al. | |
| 8,239,944 B1 | 8/2012 | Nachenberg et al. | |
| 8,260,914 B1 | 9/2012 | Ranjan | |
| 8,286,251 B2 | 10/2012 | Eker et al. | |
| 8,291,499 B2 | 10/2012 | Aziz et al. | |
| 8,307,435 B1 | 11/2012 | Mann et al. | |
| 8,307,443 B2 | 11/2012 | Wang et al. | |
| 8,312,545 B2 | 11/2012 | Tuvell et al. | |
| 8,321,936 B1 | 11/2012 | Green et al. | |
| 8,321,941 B2 | 11/2012 | Tuvell et al. | |
| 8,332,571 B1 * | 12/2012 | Edwards, Sr. | 711/6 |
| 8,365,286 B2 | 1/2013 | Poston | |
| 8,365,297 B1 | 1/2013 | Parshin et al. | |
| 8,370,938 B1 | 2/2013 | Daswani et al. | |
| 8,370,939 B2 | 2/2013 | Zaitsev et al. | |
| 8,375,444 B2 | 2/2013 | Aziz et al. | |
| 8,381,299 B2 | 2/2013 | Stolfo et al. | |
| 8,402,529 B1 | 3/2013 | Green et al. | |
| 8,464,340 B2 | 6/2013 | Ahn et al. | |
| 8,479,174 B2 | 7/2013 | Chiriac | |
| 8,479,276 B1 | 7/2013 | Vaystikh et al. | |
| 8,479,291 B1 | 7/2013 | Bodke | |
| 8,510,827 B1 | 8/2013 | Leake et al. | |
| 8,510,828 B1 * | 8/2013 | Guo et al. | 726/22 |
| 8,510,842 B2 | 8/2013 | Amit et al. | |
| 8,516,478 B1 | 8/2013 | Edwards et al. | |
| 8,516,590 B1 | 8/2013 | Ranadive et al. | |
| 8,516,593 B2 | 8/2013 | Aziz | |
| 8,522,348 B2 | 8/2013 | Chen et al. | |
| 8,528,086 B1 | 9/2013 | Aziz | |
| 8,533,824 B2 | 9/2013 | Hutton et al. | |
| 8,539,582 B1 | 9/2013 | Aziz et al. | |
| 8,549,638 B2 | 10/2013 | Aziz | |
| 8,555,391 B1 | 10/2013 | Demir et al. | |
| 8,561,177 B1 | 10/2013 | Aziz et al. | |
| 8,566,946 B1 | 10/2013 | Aziz et al. | |
| 8,584,094 B2 | 11/2013 | Dadhia et al. | |
| 8,584,234 B1 | 11/2013 | Sobel et al. | |
| 8,584,239 B2 | 11/2013 | Aziz et al. | |
| 8,595,834 B2 | 11/2013 | Xie et al. | |
| 8,627,476 B1 | 1/2014 | Satish et al. | |
| 8,635,696 B1 | 1/2014 | Aziz | |
| 8,682,054 B2 | 3/2014 | Xue et al. | |
| 8,682,812 B1 | 3/2014 | Ranjan | |

(56) References Cited

U.S. PATENT DOCUMENTS

| | | | |
|---|---|---|---|
| 8,689,333 | B2 | 4/2014 | Aziz |
| 8,695,096 | B1 | 4/2014 | Zhang |
| 8,713,631 | B1 | 4/2014 | Pavlyushchik |
| 8,713,681 | B2 | 4/2014 | Silberman et al. |
| 8,726,392 | B1 | 5/2014 | McCorkendale et al. |
| 8,739,280 | B2 | 5/2014 | Chess et al. |
| 8,776,229 | B1 | 7/2014 | Aziz |
| 8,782,792 | B1 | 7/2014 | Bodke |
| 8,789,172 | B2 | 7/2014 | Stolfo et al. |
| 8,789,178 | B2 | 7/2014 | Kejriwal et al. |
| 8,793,787 | B2 | 7/2014 | Ismael et al. |
| 8,805,947 | B1 | 8/2014 | Kuzkin et al. |
| 8,806,647 | B1 | 8/2014 | Daswani et al. |
| 8,832,829 | B2 | 9/2014 | Manni et al. |
| 8,850,570 | B1 | 9/2014 | Ramzan |
| 8,850,571 | B2 | 9/2014 | Staniford et al. |
| 8,881,234 | B2 | 11/2014 | Narasimhan et al. |
| 8,881,282 | B1 | 11/2014 | Aziz et al. |
| 8,898,788 | B1 | 11/2014 | Aziz et al. |
| 8,935,779 | B2 | 1/2015 | Manni et al. |
| 8,984,638 | B1 | 3/2015 | Aziz et al. |
| 8,990,939 | B2 | 3/2015 | Staniford et al. |
| 8,997,219 | B2 | 3/2015 | Staniford et al. |
| 9,009,822 | B1 | 4/2015 | Ismael et al. |
| 9,009,823 | B1 | 4/2015 | Ismael et al. |
| 9,027,135 | B1 | 5/2015 | Aziz |
| 9,071,638 | B1 | 6/2015 | Aziz et al. |
| 9,106,694 | B2 | 8/2015 | Aziz et al. |
| 2001/0005889 | A1 | 6/2001 | Albrecht |
| 2001/0047326 | A1 | 11/2001 | Broadbent et al. |
| 2002/0018903 | A1 | 2/2002 | Kokubo et al. |
| 2002/0038430 | A1 | 3/2002 | Edwards et al. |
| 2002/0091819 | A1 | 7/2002 | Melchione et al. |
| 2002/0095607 | A1 | 7/2002 | Lin-Hendel |
| 2002/0116627 | A1 | 8/2002 | Tarbotton et al. |
| 2002/0144156 | A1 | 10/2002 | Copeland, III |
| 2002/0162015 | A1 | 10/2002 | Tang |
| 2002/0166063 | A1 | 11/2002 | Lachman et al. |
| 2002/0169952 | A1 | 11/2002 | DiSanto et al. |
| 2002/0184528 | A1 | 12/2002 | Shevenell et al. |
| 2002/0188887 | A1 | 12/2002 | Largman et al. |
| 2002/0194490 | A1 | 12/2002 | Halperin et al. |
| 2003/0074578 | A1 | 4/2003 | Ford et al. |
| 2003/0084318 | A1 | 5/2003 | Schertz |
| 2003/0101381 | A1 | 5/2003 | Mateev et al. |
| 2003/0115483 | A1 | 6/2003 | Liang |
| 2003/0188190 | A1 | 10/2003 | Aaron et al. |
| 2003/0191957 | A1 | 10/2003 | Hypponen et al. |
| 2003/0200460 | A1 | 10/2003 | Morota et al. |
| 2003/0212902 | A1 | 11/2003 | Van der Made |
| 2003/0229801 | A1 | 12/2003 | Kouznetsov et al. |
| 2003/0237000 | A1 | 12/2003 | Denton et al. |
| 2004/0003323 | A1 | 1/2004 | Bennett et al. |
| 2004/0015712 | A1 | 1/2004 | Szor |
| 2004/0019832 | A1 | 1/2004 | Arnold et al. |
| 2004/0047356 | A1 | 3/2004 | Bauer |
| 2004/0083408 | A1 | 4/2004 | Spiegel et al. |
| 2004/0088581 | A1 | 5/2004 | Brawn et al. |
| 2004/0093513 | A1 | 5/2004 | Cantrell et al. |
| 2004/0111531 | A1 | 6/2004 | Staniford et al. |
| 2004/0117478 | A1 | 6/2004 | Triulzi et al. |
| 2004/0117624 | A1 | 6/2004 | Brandt et al. |
| 2004/0128355 | A1 | 7/2004 | Chao et al. |
| 2004/0165588 | A1 | 8/2004 | Pandya |
| 2004/0236963 | A1 | 11/2004 | Danford et al. |
| 2004/0243349 | A1 | 12/2004 | Greifeneder et al. |
| 2004/0249911 | A1 | 12/2004 | Alkhatib et al. |
| 2004/0255161 | A1 | 12/2004 | Cavanaugh |
| 2004/0268147 | A1 | 12/2004 | Wiederin et al. |
| 2005/0005159 | A1 | 1/2005 | Oliphant |
| 2005/0021740 | A1 | 1/2005 | Bar et al. |
| 2005/0033960 | A1 | 2/2005 | Vialen et al. |
| 2005/0033989 | A1 | 2/2005 | Poletto et al. |
| 2005/0050148 | A1 | 3/2005 | Mohammadioun et al. |
| 2005/0086523 | A1 | 4/2005 | Zimmer et al. |
| 2005/0091513 | A1 | 4/2005 | Mitomo et al. |
| 2005/0091533 | A1 | 4/2005 | Omote et al. |
| 2005/0091652 | A1 | 4/2005 | Ross et al. |
| 2005/0108562 | A1 | 5/2005 | Khazan et al. |
| 2005/0114663 | A1 | 5/2005 | Cornell et al. |
| 2005/0125195 | A1 | 6/2005 | Brendel |
| 2005/0149726 | A1* | 7/2005 | Joshi et al. .................. 713/164 |
| 2005/0157662 | A1 | 7/2005 | Bingham et al. |
| 2005/0183143 | A1 | 8/2005 | Anderholm et al. |
| 2005/0201297 | A1 | 9/2005 | Peikari |
| 2005/0210533 | A1 | 9/2005 | Copeland et al. |
| 2005/0238005 | A1 | 10/2005 | Chen et al. |
| 2005/0240781 | A1 | 10/2005 | Gassoway |
| 2005/0262562 | A1 | 11/2005 | Gassoway |
| 2005/0265331 | A1 | 12/2005 | Stolfo |
| 2005/0268338 | A1* | 12/2005 | Made .............. G06F 21/562 726/24 |
| 2005/0273856 | A1* | 12/2005 | Huddleston .......... G06F 21/53 726/22 |
| 2005/0283839 | A1 | 12/2005 | Cowburn |
| 2006/0010495 | A1 | 1/2006 | Cohen et al. |
| 2006/0015416 | A1 | 1/2006 | Hoffman et al. |
| 2006/0015715 | A1 | 1/2006 | Anderson |
| 2006/0015747 | A1 | 1/2006 | Van de Ven |
| 2006/0021029 | A1* | 1/2006 | Brickell .............. G06F 21/51 726/22 |
| 2006/0021054 | A1 | 1/2006 | Costa et al. |
| 2006/0031476 | A1 | 2/2006 | Mathes et al. |
| 2006/0047665 | A1 | 3/2006 | Neil |
| 2006/0070130 | A1 | 3/2006 | Costea et al. |
| 2006/0075496 | A1 | 4/2006 | Carpenter et al. |
| 2006/0095968 | A1 | 5/2006 | Portolani et al. |
| 2006/0101516 | A1 | 5/2006 | Sudaharan et al. |
| 2006/0101517 | A1 | 5/2006 | Banzhof et al. |
| 2006/0117385 | A1 | 6/2006 | Mester et al. |
| 2006/0123477 | A1 | 6/2006 | Raghavan et al. |
| 2006/0143709 | A1 | 6/2006 | Brooks et al. |
| 2006/0150249 | A1 | 7/2006 | Gassen et al. |
| 2006/0161983 | A1 | 7/2006 | Cothrell et al. |
| 2006/0161987 | A1 | 7/2006 | Levy-Yurista |
| 2006/0161989 | A1 | 7/2006 | Reshef et al. |
| 2006/0164199 | A1 | 7/2006 | Gilde et al. |
| 2006/0173992 | A1 | 8/2006 | Weber et al. |
| 2006/0179147 | A1 | 8/2006 | Tran et al. |
| 2006/0184632 | A1 | 8/2006 | Marino et al. |
| 2006/0191010 | A1 | 8/2006 | Benjamin |
| 2006/0221956 | A1 | 10/2006 | Narayan et al. |
| 2006/0236393 | A1 | 10/2006 | Kramer et al. |
| 2006/0242709 | A1 | 10/2006 | Seinfeld et al. |
| 2006/0248519 | A1 | 11/2006 | Jaeger et al. |
| 2006/0248582 | A1 | 11/2006 | Panjwani et al. |
| 2006/0251104 | A1 | 11/2006 | Koga |
| 2006/0288417 | A1 | 12/2006 | Bookbinder et al. |
| 2007/0006288 | A1 | 1/2007 | Mayfield et al. |
| 2007/0006313 | A1 | 1/2007 | Porras et al. |
| 2007/0011174 | A1 | 1/2007 | Takaragi et al. |
| 2007/0016951 | A1 | 1/2007 | Piccard et al. |
| 2007/0033645 | A1 | 2/2007 | Jones |
| 2007/0038943 | A1 | 2/2007 | FitzGerald et al. |
| 2007/0064689 | A1 | 3/2007 | Shin et al. |
| 2007/0074169 | A1 | 3/2007 | Chess et al. |
| 2007/0094730 | A1 | 4/2007 | Bhikkaji et al. |
| 2007/0101435 | A1 | 5/2007 | Konanka et al. |
| 2007/0128855 | A1 | 6/2007 | Cho et al. |
| 2007/0142030 | A1 | 6/2007 | Sinha et al. |
| 2007/0143827 | A1 | 6/2007 | Nicodemus et al. |
| 2007/0156895 | A1 | 7/2007 | Vuong |
| 2007/0157180 | A1 | 7/2007 | Tillmann et al. |
| 2007/0157306 | A1 | 7/2007 | Elrod et al. |
| 2007/0168988 | A1 | 7/2007 | Eisner et al. |
| 2007/0171824 | A1 | 7/2007 | Ruello et al. |
| 2007/0174915 | A1 | 7/2007 | Gribble et al. |
| 2007/0192500 | A1 | 8/2007 | Lum |
| 2007/0192858 | A1 | 8/2007 | Lum |
| 2007/0198275 | A1 | 8/2007 | Malden et al. |
| 2007/0208822 | A1 | 9/2007 | Wang et al. |
| 2007/0220607 | A1 | 9/2007 | Sprosts et al. |
| 2007/0240218 | A1 | 10/2007 | Tuvell et al. |
| 2007/0240219 | A1 | 10/2007 | Tuvell et al. |

(56) References Cited

U.S. PATENT DOCUMENTS

| | | |
|---|---|---|
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0270994 A1* | 10/2008 | Li .................... G06F 11/366 717/128 |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1* | 1/2009 | Field .................. G06F 21/53 718/1 |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1* | 9/2010 | Dittmer .................... 718/1 |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1* | 12/2010 | Frank ...................... 707/640 |
| 2011/0004737 A1* | 1/2011 | Greenebaum ............ 711/163 |
| 2011/0025504 A1 | 2/2011 | Lyon et al. |
| 2011/0041179 A1 | 2/2011 | Stahlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1* | 9/2011 | Niemela et al. ............... 726/24 |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2011/0321165 A1* | 12/2011 | Capalik .............. G06F 11/3471 726/25 |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1* | 3/2012 | Thomas et al. ................ 726/24 |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1* | 5/2012 | Maybee et al. ............ 714/38.11 |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |

(56) References Cited

U.S. PATENT DOCUMENTS

| | | | |
|---|---|---|---|
| 2013/0111587 A1 | 5/2013 | Goel et al. | |
| 2013/0117852 A1 | 5/2013 | Stute | |
| 2013/0117855 A1 | 5/2013 | Kim et al. | |
| 2013/0139264 A1 | 5/2013 | Brinkley et al. | |
| 2013/0145463 A1* | 6/2013 | Ghosh | G06F 21/56 726/22 |
| 2013/0160125 A1 | 6/2013 | Likhachev et al. | |
| 2013/0160127 A1 | 6/2013 | Jeong et al. | |
| 2013/0160130 A1 | 6/2013 | Mendelev et al. | |
| 2013/0160131 A1 | 6/2013 | Madou et al. | |
| 2013/0167236 A1 | 6/2013 | Sick | |
| 2013/0174214 A1* | 7/2013 | Duncan | 726/1 |
| 2013/0185789 A1 | 7/2013 | Hagiwara et al. | |
| 2013/0185795 A1 | 7/2013 | Winn et al. | |
| 2013/0185798 A1 | 7/2013 | Saunders et al. | |
| 2013/0191915 A1 | 7/2013 | Antonakakis et al. | |
| 2013/0196649 A1 | 8/2013 | Paddon et al. | |
| 2013/0227691 A1 | 8/2013 | Aziz et al. | |
| 2013/0246370 A1 | 9/2013 | Bartram et al. | |
| 2013/0263260 A1 | 10/2013 | Mahaffey et al. | |
| 2013/0291109 A1 | 10/2013 | Staniford et al. | |
| 2013/0298243 A1 | 11/2013 | Kumar et al. | |
| 2014/0053260 A1 | 2/2014 | Gupta et al. | |
| 2014/0053261 A1 | 2/2014 | Gupta et al. | |
| 2014/0130158 A1 | 5/2014 | Wang et al. | |
| 2014/0137180 A1* | 5/2014 | Lukacs et al. | 726/1 |
| 2014/0169762 A1 | 6/2014 | Ryu | |
| 2014/0179360 A1 | 6/2014 | Jackson et al. | |
| 2014/0328204 A1 | 11/2014 | Klotsche et al. | |
| 2014/0337836 A1 | 11/2014 | Ismael | |
| 2014/0351935 A1 | 11/2014 | Shao et al. | |
| 2015/0096025 A1 | 4/2015 | Ismael | |

FOREIGN PATENT DOCUMENTS

| | | |
|---|---|---|
| WO | WO-02/06928 | 1/2002 |
| WO | WO-02/23805 | 3/2002 |
| WO | WO-2007-117636 | 10/2007 |
| WO | WO-2008/041950 | 4/2008 |
| WO | WO-2011/084431 | 7/2011 |
| WO | 2011/112348 A1 | 9/2011 |
| WO | 2012/075336 A1 | 6/2012 |
| WO | WO-2012145066 | 10/2012 |

OTHER PUBLICATIONS

*AltaVista Advanced Search Results. "Event Orchestrator".* Http://www.altavista.com/web/results?Itag=ody&pg=aq&aqmode=aqa=-Event+Orchesrator . . . , (Accessed on Sep. 3, 2009).
*AltaVista Advanced Search Results. "attack vector identifier".* Http://www.altavista.com/web/results?Itag=ody&pg=aq&aqmode=aqa=Event+Orchestrator . . . , (Accessed on Sep. 15, 2009).
*Cisco, Configuring the Catalyst Switched Port Analyzer (SPAN)* ("Cisco"), (1992-2003).
Reiner Sailer, Enriquillo Valdez, Trent Jaeger, Roonald Perez, Leendert van Doorn, John Linwood Griffin, Stefan Berger., *sHype: Secure Hypervisor Approach to Trusted Virtualized Systems* (Feb. 2, 2005) ("Sailer").
Excerpt regarding First Printing Date for Merike Kaeo, *Designing Network Security* ("Kaeo"), (2005).
*The Sniffers's Guide to Raw Traffic* available at: yuba.stanford.edu/~casado/pcap/section1.html, (Jan. 6, 2014).
"Packet", *Microsoft Computer Dictionary, Microsoft Press*, (Mar. 2002), 1 page.
"When Virtual is Better Than Real", *IEEEXplore Digital Library*, available at, http://ieeexplore.ieee.org/xpl/articleDetails.jsp?reload=true&arnumber=990073, (Dec. 7, 2013).
Abdullah, et al., *Visualizing Network Data for Intrusion Detection, 2005 IEEE Workshop on Information Assurance and Security*, pp. 100-108.
Adetoye, Adedayo, et al., "Network Intrusion Detection & Response System", ("Adetoye"), (Sep. 2003).
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", *J Comput Virol*, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, *Proceedings of the 2005 ACM Conference on Emerging Network Experiment and Technology*, CoNEXT '05, Toulousse, France, (Oct. 2005), pp. 71-82.
Cohen, M.I. , "PyFlag—An advanced network forensic framework", *Digital investigation 5*, Elsevier, (2008), pp. S112-S120
Costa, M. , et al., "Vigilante: End-to-End Containment of Internet Worms", *SOSP '05, Association for Computing Machinery, Inc.*, Brighton U.K., (Oct. 23-26, 2005).
Crandall, J.R. , et al., "Minos:Control Data Attack Prevention Orthogonal to Memory Model", *37th International Symposium on Microarchitecture*, Portland, Oregon, (Dec. 2004).
Deutsch, P. , ""Zlib compressed data format specification version 3.3" RFC 1950, (1996)".
Distler, "Malware Analysis: An Introduction", *SANS Institute InfoSec Reading Room*, SANS Institute, (2007).
Dunlap, George W. , et al., "ReVirt: Enabling Intrusion Analysis through Virtual-Machine Logging and Replay", *Proceeding of the 5th Symposium on Operating Systems Design and Implementation, USENIX Association*, ("Dunlap"), (Dec. 9, 2002).
Filiol, Eric , et al., "Combinatorial Optimisation of Worm Propagation on an Unknown Network", International Journal of Computer Science 2.2 (2007).
Goel, et al., Reconstructing System State for Intrusion Analysis, Apr. 2008 *SIGOPS Operating Systems Review*, vol. 42 Issue 3, pp. 21-28.
Hjelmvik, Erik , "Passive Network Security Analysis with NetworkMiner", *(IN)Secure*, Issue 18, (Oct. 2008), pp. 1-100.
Kaeo, Merike , "Designing Network Security", ("Kaeo"), (Nov. 2003).
Kim, H. , et al., "Autograph: Toward Automated, Distributed Worm Signature Detection", *Proceedings of the 13th USENIX Security Symposium (Security 2004)*, San Diego, (Aug. 2004), pp. 271-286.
King, Samuel T., et al., "Operating System Support for Virtual Machines", ("King").
Krasnyansky, Max , et al., *Universal TUN/TAP driver*, available at https://www.kernel.org/doc/Documentation/networking/tuntap.txt (2002) ("Krasnyansky").
Kreibich, C. , et al., "Honeycomb-Creating Intrusion Detection Signatures Using Honeypots", *2nd Workshop on Hot Topics in Networks (HotNets-11)*, Boston, USA, (2003).
Kristoff, J. , "Botnets, Detection and Mitigation: DNS-Based Techniques", *NU Security Day*, (2005), 23 pages.
Liljenstam, Michael , et al., "Simulating Realistic Network Traffic for Worm Warning System Design and Testing", *Institute for Security Technology studies*, Dartmouth College ("Liljenstam"), (Oct. 27, 2003).
Marchette, David J., "Computer Intrusion Detection and Network Monitoring: A Statistical Viewpoint", ("Marchette") (2001).
Margolis, P.E. , "Random House Webster's 'Computer & Internet Dictionary 3rd Edition'", ISBN 0375703519, (Dec. 1998).
Moore, D. , et al., "Internet Quarantine: Requirements for Containing Self-Propagating Code", *INFOCOM*, vol. 3, (Mar. 30-Apr. 3, 2003), pp. 1901-1910.
Morales, Jose A., et al., ""Analyzing and exploiting network behaviors of malware."", *Security and Privacy in Communication Networks*. Springer Berlin Heidelberg, 2010. 20-34.
Natvig, Kurt , "SANDBOXII: Internet", *Virus Bulletin Conference*, ("Natvig"), (Sep. 2002).
NetBIOS Working Group. Protocol Standard for a NetBIOS Service on a TCP/UDP transport: Concepts and Methods. STD 19, RFC 1001, Mar. 1987.

(56) References Cited

OTHER PUBLICATIONS

Newsome, J., et al., "Dynamic Taint Analysis for Automatic Detection, Analysis, and Signature Generation of Exploits on Commodity Software", *In Proceedings of the 12th Annual Network and Distributed System Security, Symposium* (NDSS '05), (Feb. 2005).

Newsome, J., et al., "Polygraph: Automatically Generating Signatures for Polymorphic Worms", *In Proceedings of the IEEE Symposium on Security and Privacy*, (May 2005).

Nojiri, D., et al., "Cooperation Response Strategies for Large Scale Attack Mitigation", *DARPA Information Survivability Conference and Exposition*, vol. 1, (Apr. 22-24, 2003), pp. 293-302.

Peter M. Chen, and Brian D. Noble, "When Virtual Is Better Than Real, Department of Electrical Engineering and Computer Science", *University of Michigan* ("Chen").

Silicon Defense, "Worm Containment in the Internal Network", (Mar. 2003), pp. 1-25.

Singh, S., et al., "Automated Worm Fingerprinting", *Proceedings of the ACM/USENIX Symposium on Operating System Design and Implementation*, San Francisco, California, (Dec. 2004).

Spitzner, Lance, "Honeypots: Tracking Hackers", ("Spizner"), (Sep. 17, 2002).

Thomas H. Ptacek, and Timothy N. Newsham, "Insertion, Evasion, and Denial of Service: Eluding Network Intrusion Detection", *Secure Networks*, ("Ptacek"), (Jan. 1998).

Venezia, Paul, "NetDetector Captures Intrusions", *InfoWorld Issue 27*, ("Venezia"), (Jul. 14, 2003), Whyte, et al., "DNS-Based Detection of Scanning Works in an Enterprise Network", *Proceedings of the 12th Annual Network and Distributed System Security Symposium*, (Feb. 2005), 15 pages.

Williamson, Matthew M., "Throttling Viruses: Restricting Propagation to Defeat Malicious Mobile Code", *ACSAC Conference*, Las Vegas, NV, USA, (Dec. 2002), pp. 1-9.

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.jsp?reload=true&arnumbe- r=990073, (Dec. 7, 2013).

Cisco "Intrusion Prevention for the Cisco ASA 5500-x Series" Data Sheet (2012).

* cited by examiner

250

Receive, at the controller, a dump file generated by a monitor of a virtual machine (VM), where the dump file captures operational information a malicious content suspect executed in the VM.
251

↓

Parse using a memory dump parser the dump file to interpret the dump file.
252

↓

Generate a malware analysis report indicating whether the malicious content suspect is likely malicious based on the interpretation of the dump file.
253

↓

In response to a request from a user, optionally present the malware analysis report via a user interface (e.g., Web interface).
254

FIG. 2B

FILE EXTRACTION FROM MEMORY DUMP FOR MALICIOUS CONTENT ANALYSIS

FIELD OF THE INVENTION

Embodiments of the present invention relate generally to malicious content detection. More particularly, embodiments of the invention relate to performing a malicious content analysis based on memory dump of a malware suspect.

BACKGROUND

Malicious software, or malware for short, may include any program or file that is harmful by design to a computer. Malware includes computer viruses, worms, Trojan horses, adware, spyware, and any programming that gathers information about a computer or its user or otherwise operates without permission. The owners of the computers are often unaware that these programs have been added to their computers and are often similarly unaware of their function.

Malicious network content is a type of malware distributed over a network via websites, e.g., servers operating on a network according to an hypertext transfer protocol (HTTP) standard or other well-known standard. Malicious network content distributed in this manner may be actively downloaded and installed on a computer, without the approval or knowledge of its user, simply by the computer accessing the web site hosting the malicious network content (the "malicious web site"). Malicious network content may be embedded within objects associated with web pages hosted by the malicious web site. Malicious network content may also enter a computer on receipt or opening of email. For example, email may contain an attachment, such as a PDF document, with embedded malicious executable programs. Furthermore, malicious content may exist in files contained in a computer memory or storage device, having infected those files through any of a variety of attack vectors.

Various processes and devices have been employed to prevent the problems associated with malicious content. For example, computers often run antivirus scanning software that scans a particular computer for viruses and other forms of malware. The scanning typically involves automatic detection of a match between content stored on the computer (or attached media) and a library or database of signatures of known malware. The scanning may be initiated manually or based on a schedule specified by a user or system administrator associated with the particular computer. Unfortunately, by the time malware is detected by the scanning software, some damage on the computer or loss of privacy may have already occurred, and the malware may have propagated from the infected computer to other computers. Additionally, it may take days or weeks for new signatures to be manually created, the scanning signature library updated and received for use by the scanning software, and the new signatures employed in new scans.

Moreover, anti-virus scanning utilities may have limited effectiveness to protect against all exploits by polymorphic malware. Polymorphic malware has the capability to mutate to defeat the signature match process while keeping its original malicious capabilities intact. Signatures generated to identify one form of a polymorphic virus may not match against a mutated form. Thus polymorphic malware is often referred to as a family of virus rather than a single virus, and improved anti-virus techniques to identify such malware families is desirable.

Another type of malware detection solution employs virtual environments to replay content within a sandbox established by virtual machines (VMs). Such solutions monitor the behavior of content during execution to detect anomalies that may signal the presence of malware. One such system offered by FireEye, Inc., the assignee of the present patent application, employs a two-phase malware detection approach to detect malware contained in network traffic monitored in real-time. In a first or "static" phase, a heuristic is applied to network traffic to identify and filter packets that appear suspicious in that they exhibit characteristics associated with malware. In a second or "dynamic" phase, the suspicious packets (and typically only the suspicious packets) are replayed within one or more virtual machines. For example, if a user is trying to download a file over a network, the file is extracted from the network traffic and analyzed in the virtual machine. The results of the analysis aids in determining whether the file is malicious. The two-phase malware detection solution may detect numerous types of malware and, even malware missed by other commercially available approaches. Through verification, the two-phase malware detection solution may also achieve a significant reduction of false positives relative to such other commercially available approaches. Dealing with false positives in malware detection may needlessly slow or interfere with download of network content or receipt of email, for example. This two-phase approach has even proven successful against many types of polymorphic malware and other forms of advanced persistent threats.

Some malware may have embedded malicious content therein that has been encrypted. The malicious content may only be decrypted and extracted during the execution of the malware or when the malware is being accessed. For example, a file such as a portable document format (PDF) file may include embedded code, which when the file is being accessed (e.g., opened by an Abode Acrobat™ reader) will access a remote Web site to download malicious content and store the same at a storage of the local device. The code may be encrypted within the PDF file that a typical malware detection process cannot decrypt without knowing the corresponding decryption method. Similarly, a malicious content suspect may include an authorized file embedded and encrypted therein, which is extracted and decrypted only during an execution of the malicious content suspect. It is difficult to track down where the extracted material has been stored and to determine whether the encrypted content is malicious.

BRIEF DESCRIPTION OF THE DRAWINGS

Embodiments of the invention are illustrated by way of example and not limitation in the figures of the accompanying drawings in which like references indicate similar elements.

FIGS. 2A and 2B are flow diagrams illustrating a method for malicious content detection according to some embodiments of the invention.

DETAILED DESCRIPTION

Figure 1:
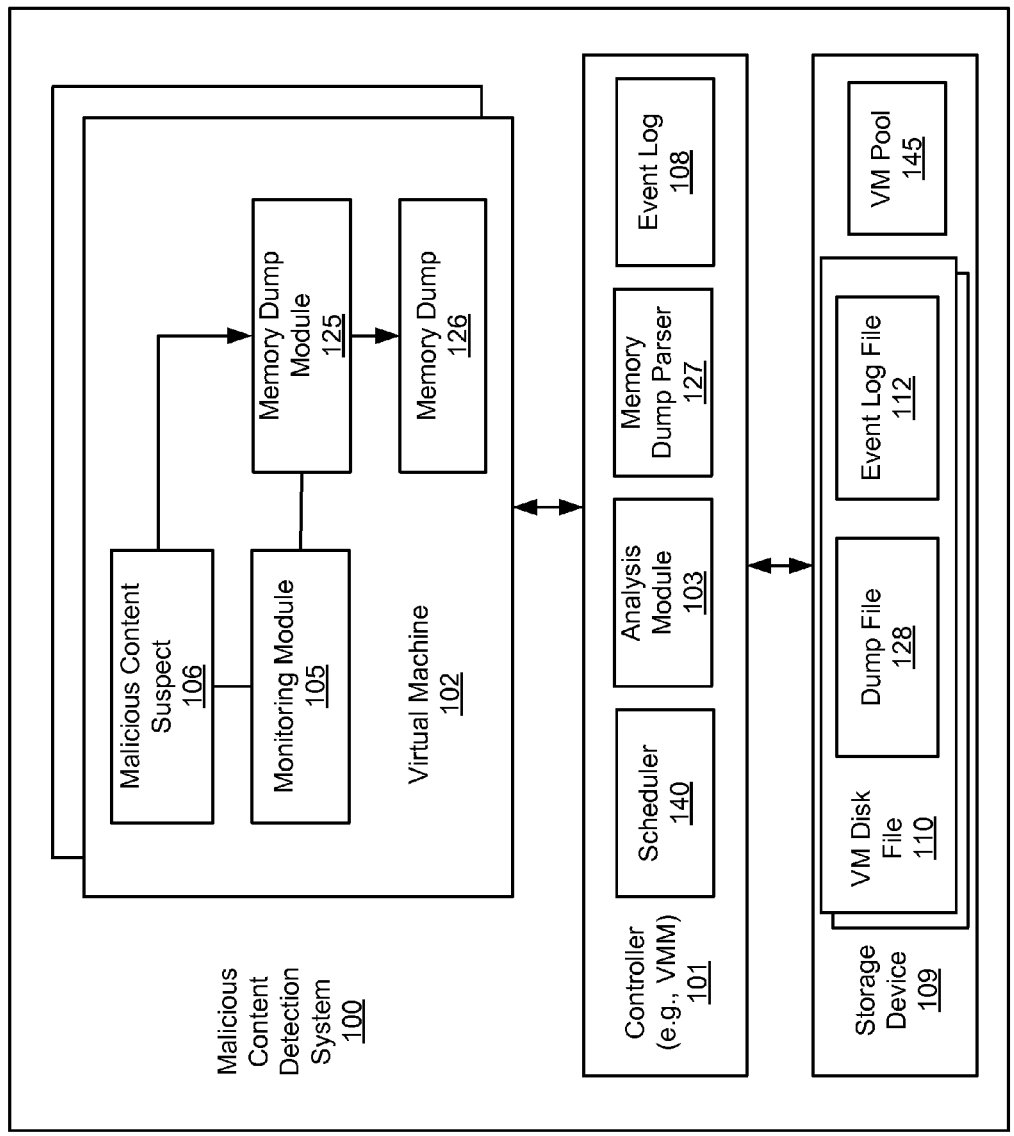
FIG. 1 is a block diagram illustrating a malicious content detection system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Techniques for malicious content detection using memory dump are described herein. According to some embodiments, a malicious content suspect (e.g., suspicious content) is executed in a virtual machine (VM) as a malicious content detection environment (e.g., sandboxed environment). During the execution of the malicious content suspect, a memory dump is captured. The memory dump includes any information in a memory of the VM associated with the malicious content suspect during the execution of the malicious content suspect. The information captured by the memory dump may include the code image of the malicious content suspect, content of a memory region that has been allocated by the malicious content suspect (e.g., heaps, threads, context), data accessed by the malicious content suspect, embedded content extracted or downloaded during the execution such as a file or another executable binary, as well as information identifying certain activities performed by the malicious content suspect. The memory dump is then analyzed to determine whether the malicious content suspect is indeed malicious. The memory dump may be stored in a dump file and analyzed subsequently (e.g., offline) for malicious content detection.

In addition, some content extracted or downloaded by the malicious content suspect during the execution may be stored as one or more files in a storage location of a storage device associated with the VM (e.g., a VM disk file). Given the nature of the VM, typically it is difficult to access those files since they are protected by the VM architecture. According to one embodiment, a file extracting mechanism is to mount at least the storage location of the storage device that the malicious content suspect has accessed into a temporary directory. The files stored by the malicious content suspect may then be identified, for example, based on the memory dump or an event log that records the events (e.g., file open, file creation) triggered by the malicious content suspect and monitored by a monitoring module running within the VM. Those files, as well as the dump file, may be accessed from the temporary directory for malicious content detection. As a result, any encrypted or embedded content that is only decrypted or extracted during the execution of the malicious content suspect can be captured and analyzed.

FIG. 1 is a block diagram illustrating a malicious content detection system according to one embodiment of the invention. Referring to FIG. 1, system 100 includes controller 101 to manage or control one or more virtual machines (VMs) 102 (also referred to as a sandboxed operating environment or simply a sandbox), where content associated with VMs 102 are stored in storage device 109 in a form of VM disk files 110.

Controller 101 may be implemented as part of a VM monitor or manager (VMM), also referred to as a hypervisor for managing or monitoring VMs, which may be hosted by a host operating system (OS). VM 102 may be hosted by a quest OS. The host OS and the guest OS may be the same type of operating systems or different types of operating systems (e.g., Windows™, Linux™, Unix™, Mac OS™, iOS™, etc.) or different versions thereof. A VM is a simulation of a machine (abstract or real) that is usually different from the target machine (where it is being simulated on). Virtual machines may be based on specifications of a hypothetical computer or emulate the computer architecture and functions of a real world computer. A virtual machine referred to herein can be any type of virtual machines, such as, for example, hardware emulation, full virtualization, para-virtualization, and operating system-level virtualization virtual machines.

According to one embodiment, when malicious content suspect 106 is received for a dynamic content analysis (as opposed to be a static content analysis described below), a scheduler 140 of controller 101 is configured to identify and select a VM, in this example VM 102, from a VM pool 145 that has been configured to closely simulate a target operating environment (e.g., particular version of an OS with particular versions of certain software installed therein) in which malicious content suspect 106 is to be analyzed. The scheduler 140 then launches VM 102 in which monitoring module 105 is running within VM 102 and configured to monitor activities and behavior of malicious content suspect 106.

In addition, monitoring module 105 maintains a persistent communication channel with analysis module 103 of controller 101 to communicate certain events or activities of malicious content suspect 106 during the execution. In response to detecting certain predetermined events triggered by malicious content suspect 106, monitoring module 105 is configured to send a message via the communication channel to analysis module 103, where the message may be recorded as part of event log 108. The message includes information identifying an event triggered by malicious content suspect 106. Event log 108 records events that have been selectively monitored and detected by monitoring module 105, such as, for example, file creation or file open events. Content of the event log 108 may be stored in a persistent storage as part of event log file(s) 112 of VM disk file 110 associated with VM 102. The recorded events may be analyzed by analysis module 103 based on a set of rules or policies (not shown) to determine whether malicious content suspect 106 is likely malicious (e.g., high probability of malicious) and/or should be declared as malicious.

In one embodiment, in response to some predetermined events (e.g., file creation, registry access, DLL loading, process execution, power management such as sleep) triggered by malicious content suspect 106, monitoring module 105 sends a message describing the event(s) via a communication channel to controller 101, which may be recorded as part of event log 108. Event log 108 may be further cached in a persistent storage as part of event log file(s) 112. In addition, monitoring module 105 invokes memory dump module 125 to capture and generate memory dump 126 that captures various information about execution of malicious content suspect 106. A memory dump refers to a snapshot of a memory region associated with or allocated to an application, in this example, malicious content suspect 106. For example, monitoring module 105 can invoking memory dump module 125 by launching memory dump module 125 and passing a process identifier (ID) of malicious content suspect 106 as a parameter to memory dump module 125. Memory dump module 125 may be a part of a memory dump utility associated with a guest OS of VM 102, such as a symbolic debugger. For example, for Windows™ operating system, memory dump module 125 may be part of the NT symbolic debugger (NTSD) utility provided by Microsoft Corporation of Redmond, Wash. Memory dump 126 can then be stored within the associated VM disk file as part of dump file 128.

NTSD is a console debugger that allows a user to analyze user-mode memory and constructs on target applications that are either console or graphical Windows™ applications. When users use NTSD to debug an application that has failed, they can obtain a stack trace or display invalid parameters. NTSD can also be used to observe the behavior of an application that is functioning properly. By using NTSD, a user can display and execute program code, set breakpoints, and examine and change values in memory. NTSD can disassemble binary code and display assembly instructions. NTSD can also enable a user to analyze source code directly.

Furthermore, memory dump 126 and/or dump file 128 can be analyzed by memory dump parser 127 (or a memory dump interpreter) for malicious content detection. In one embodiment, memory dump parser 127 may be a graphical interface debugger associated with the guest OS of VM 302. For example, for the Windows™ operating system, memory dump parser 127 may be part of WINDBG utility provided by Microsoft Corporation. WINDBG is a graphical interface debugger that supports full source-level debugging for Windows™ kernel, kernel-mode drivers, and system services, as well as user-mode applications and drivers. WINDBG can monitor variables, CPU registers, and parameters passed in function calls. It can also be used to review a memory dump file (e.g., crash dump file). By using WINDBG, a user can view source code, set breakpoints, and view variables, stack traces, and memory.

Figure 2A:
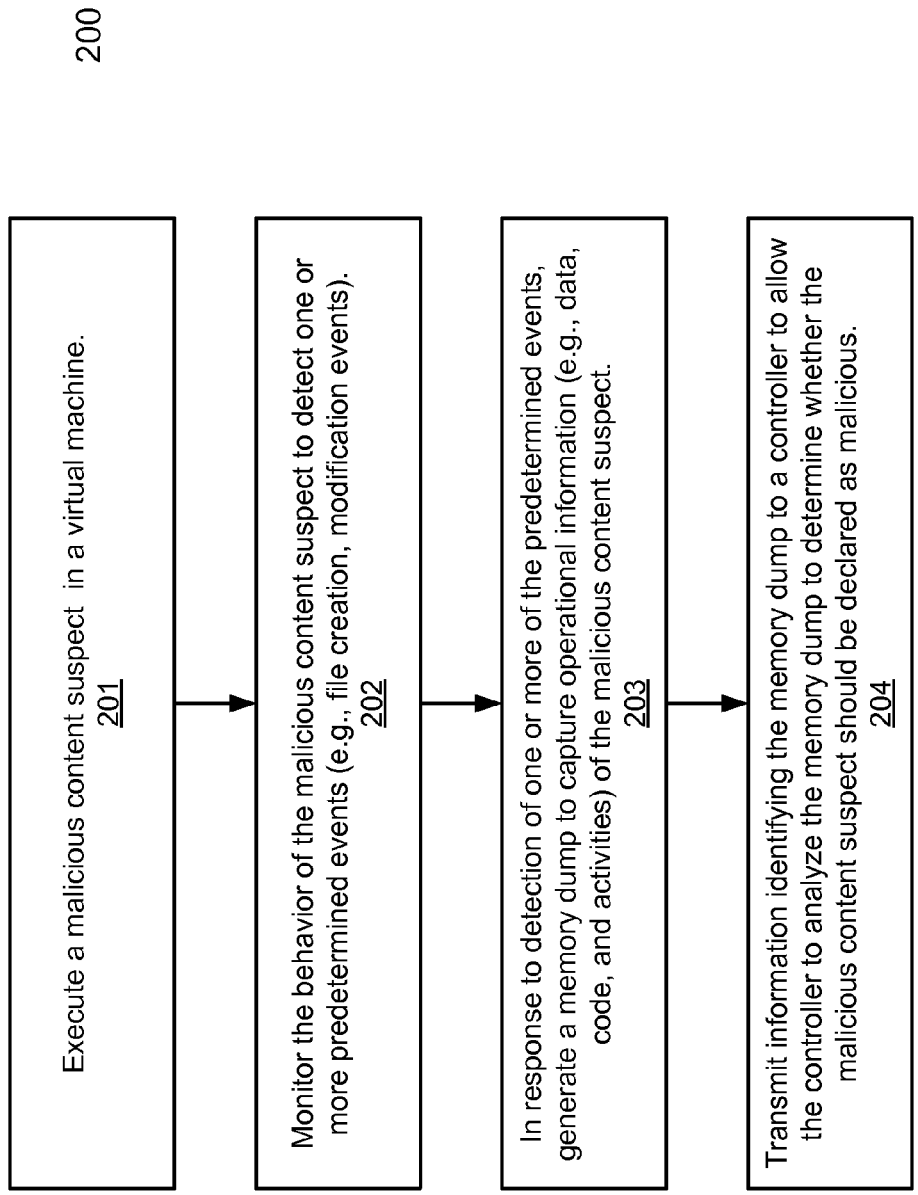

FIG. 2A is a flow diagram illustrating a method for malicious content detection according to one embodiment of the invention. Method 200 may be performed by system 100 of FIG. 1, which may be implemented as processing logic in software, hardware, or a combination of both. Referring to FIG. 2A, at block 201, processing logic executes a malicious content suspect in a virtual machine. At block 202, processing logic monitors the behavior of the malicious content suspect to determine one or more predetermined events triggered by the malicious content suspect. In response to detection of one or more predetermined events, at block 203, processing logic generates a memory dump to capture operational information (e.g., data, code, and activities) of the malicious content suspect. At block 204, the memory dump is stored in a dump file for subsequent malicious content analysis.

FIG. 2B is a flow diagram illustrating a method for malicious content detection according to another embodiment of the invention. Method 250 may be performed by system 100 of FIG. 1, which may be implemented as processing logic in software, hardware, or a combination of both. Alternatively, method 250 may be performed (e.g., offline) by a dedicated content analysis system such as one deployed in the cloud. Referring to FIG. 2B, at block 251, processing logic receives a dump file containing a memory dump of a malicious content suspect. At block 252, processing logic parses the dump file to interpret the dump file. The interpretation can be performed by a trained analyst and/or an automated process. At block 253, processing logic generates an analysis report indicating whether the malicious content suspect should be declared as malicious or having a higher probability of malicious. At block 254, processing logic optionally presents the analysis report via a user interface such as a Web interface.

Figure 3:
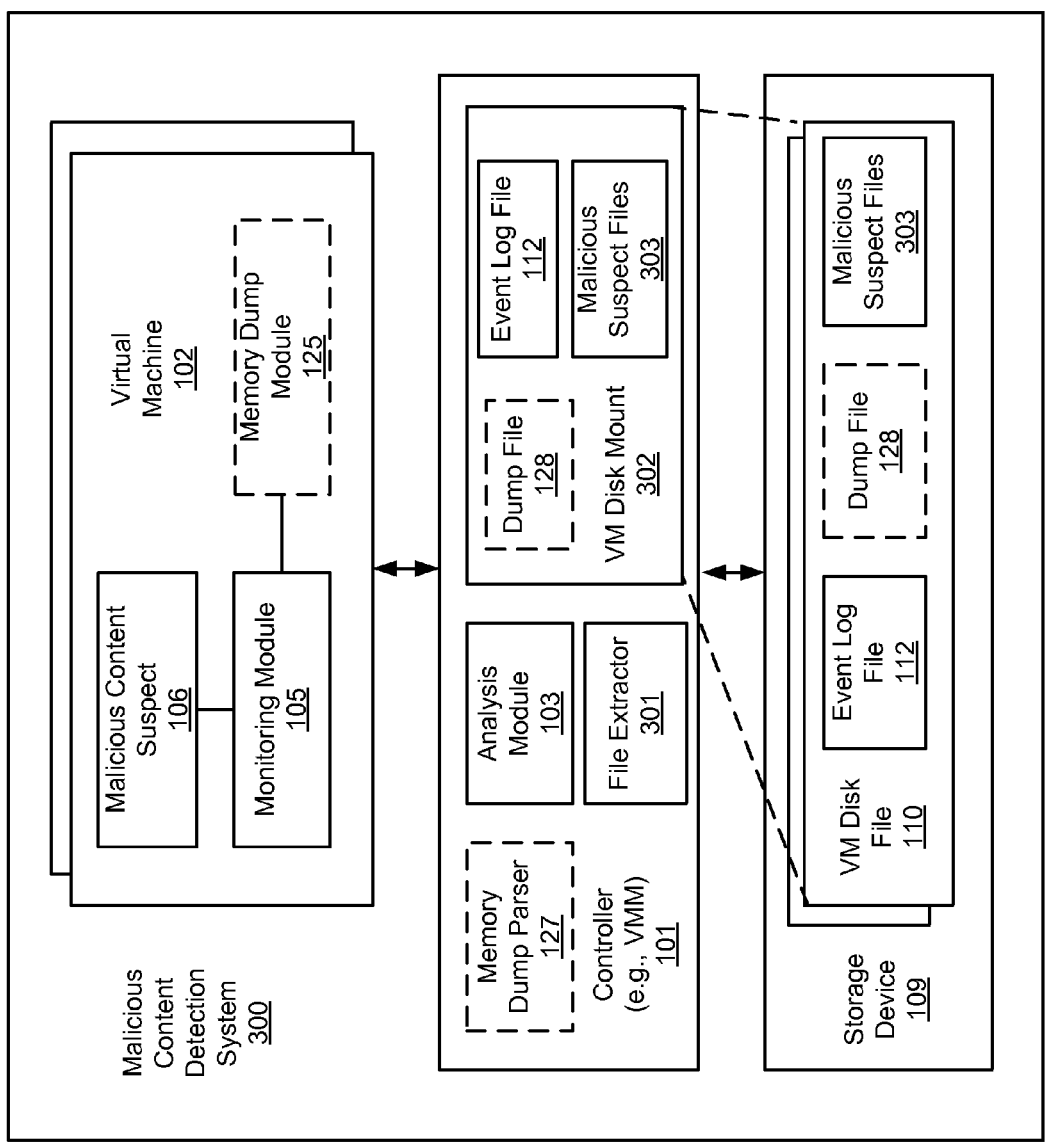
FIG. 3 is a block diagram illustrating a malicious content detection system according to another embodiment of the invention.

FIG. 3 is a block diagram illustrating a malicious content detection system according to another embodiment of the invention. Referring to FIG. 3, in addition to analysis module 103 and optional memory dump parser 127, system 300 further includes a file extractor 301 hosted by controller 101. In one embodiment, file extractor 301 is configured to extract files, such as event log file 112, dump file 128, and/or malicious suspect files 303 from VM disk file 110 associated with VM 102. Malicious suspect files 303 may be the embedded and/or encrypted by malicious content suspect 106 that has been extracted and/or decrypted by malicious content suspect 106 during its execution.

Typically, when a suspect is executed for malicious content detection, a VM is launched and the suspect is executed within the VM. After the execution, the VM will be terminated. The corresponding VM disk file may also be deleted. Thus, it is very important to retrieve the files generated during the execution from the VM disk file. Given the nature of a VM, it cannot be simply accessed as ordinary file accesses.

In one embodiment, file extractor 301 mounts at least a portion of VM disk 110 as VM disk mount 302 into a temporary or predetermined directory, such that the files stored therein (e.g., event log file 112, dump file 128, and suspect files 303) may be accessed and analyzed by analysis module 103. In one embodiment, file extractor 301 takes a snapshot of at least the relevant portion of VM disk file 110 and mounts the snapshot into a memory of the host OS as part of VM disk mount 302. The files can then be accessed (e.g., copied to another directory or storage device). For example, suspect files 303 that have been extracted or decrypted by malicious content suspect 106 can be provided as an attachment to an analysis report to an administrator of a corporate client. Suspect files 303 may be identified by examining event log file 112 and/or dump file 128.

Figure 4:
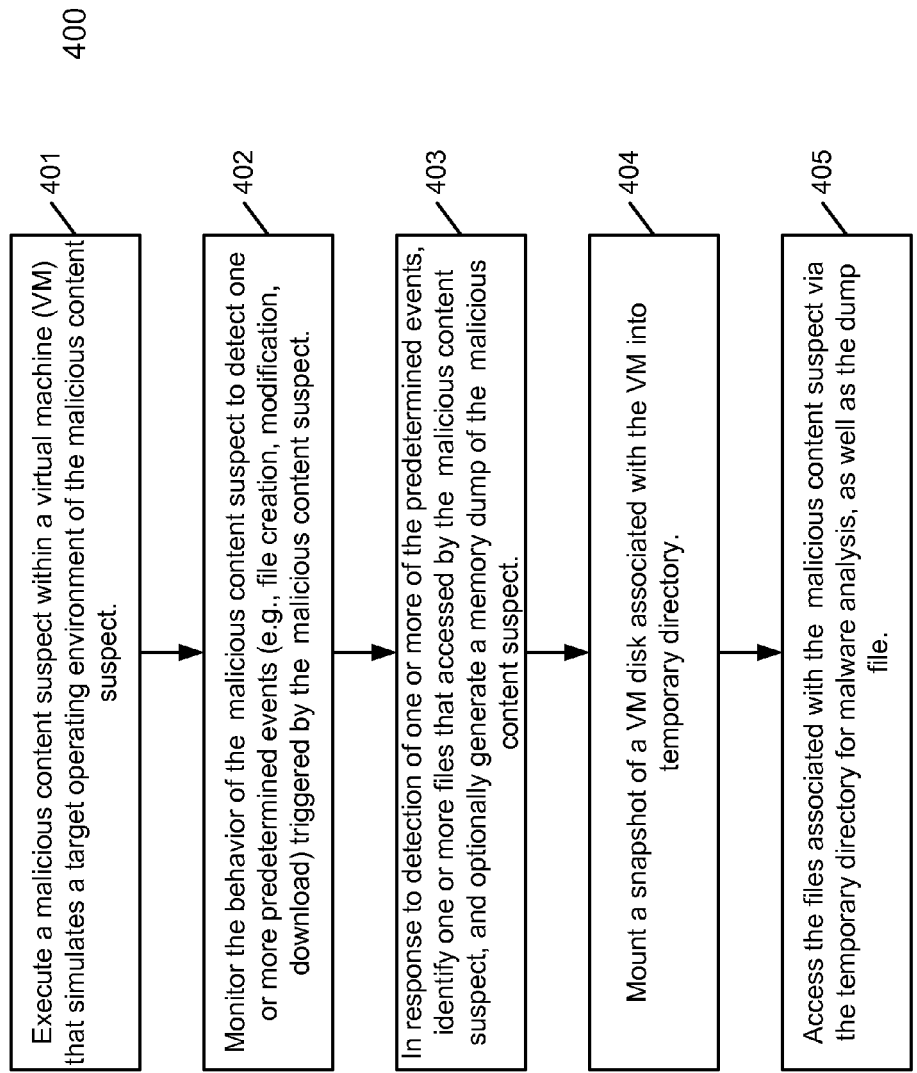
FIG. 4 is a flow diagram illustrating a method for malicious content detection according to another embodiment of the invention.

FIG. 4 is a flow diagram illustrating a method for malicious content detection according to another embodiment of the invention. Method 400 may be performed by system 300 of FIG. 3, which may be implemented as processing logic in software, hardware, or a combination thereof. Referring to FIG. 4, at block 401, processing logic executes a malicious content suspect within a VM that simulates a target operating environment of the malicious content suspect. At block 402, the execution or behavior of the malicious content suspect is monitored during the execution. For example, certain predetermined events, such as file creation or file modification events, may be monitored and recorded in an event log. In response to detection of one or more predetermined events, at block 403, one or more files accessed by the malicious content suspect are identified and optionally a memory dump of the malicious content suspect is captured and stored in a dump file. At block 404, a snapshot of at least a relevant portion of a VM disk file associated with the VM is taken and mounted onto a temporary directory. Thereafter, at block 405, the identified files, the dump file, and/or event log file(s) may be accessed via the temporary directory.

Figure 5:
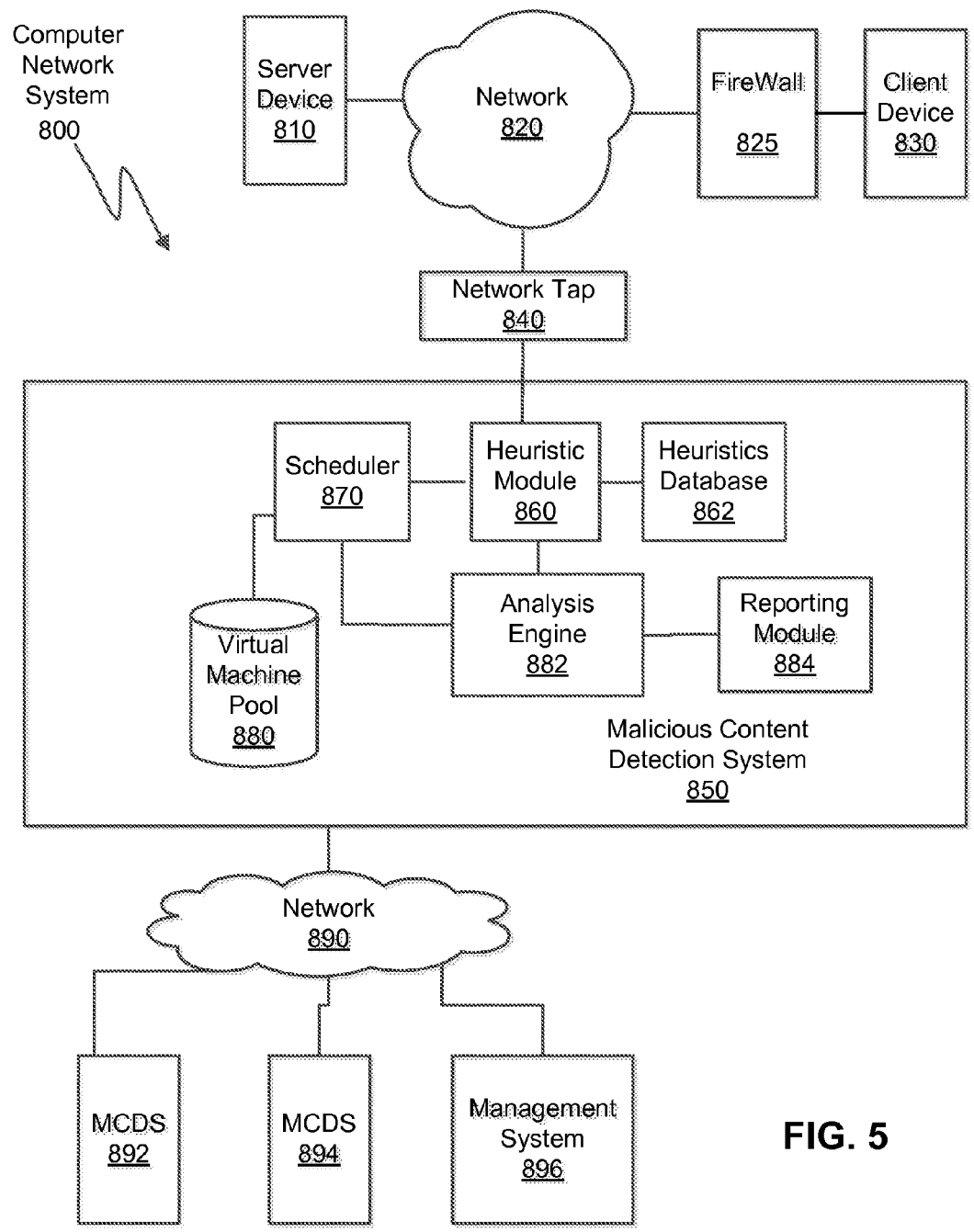
FIG. 5 is a block diagram of a computer network system deploying a malicious content detection system according to one embodiment of the invention.

FIG. 5 is a block diagram of an illustrative computer network system 800 having a malicious content detection system 850 in accordance with a further illustrative embodiment. The malicious content detection system 850 may represent any of the malicious content detection systems described above, such as, for example, detection system 100 of FIG. 1. The malicious content detection system 850 is illustrated with a server device 810 and a client device 830, each coupled for communication via a communication network 820. In various embodiments, there may be multiple server devices and multiple client devices sending and receiving data to/from each other, and the same device can serve as either a server or a client in separate communication sessions. Although FIG. 5 depicts data transmitted from the server device 810 to the client device 830, either device can transmit and receive data from the other.

Note that throughout this application, network content is utilized as an example of content for malicious content detection purposes; however, other types of content can also be applied. Network content may include any data transmitted over a network (i.e., network data). Network data may include text, software, images, audio, or other digital data. An example of network content includes web content, or any network data that may be transmitted using a Hypertext Transfer Protocol (HTTP), Hypertext Markup Language (HTML) protocol, or be transmitted in a manner suitable for display on a Web browser software application. Another example of network content includes email messages, which may be transmitted using an email protocol such as Simple Mail Transfer Protocol (SMTP), Post Office Protocol version 3 (POP3), or Internet Message Access Protocol (IMAP4). A further example of network content includes Instant Messages, which may be transmitted using an Instant Messaging protocol such as Session Initiation Protocol (SIP) or Extensible Messaging and Presence Protocol (XMPP). In addition, network content may include any network data that is transferred using other data transfer protocols, such as File Transfer Protocol (FTP).

The malicious network content detection system 850 may monitor exchanges of network content (e.g., Web content) in real-time rather than intercepting and holding the network content until such time as it can determine whether the network content includes malicious network content. The malicious network content detection system 850 may be configured to inspect exchanges of network content over the communication network 820, identify suspicious network content, and analyze the suspicious network content using a virtual machine to detect malicious network content. In this way, the malicious network content detection system 850 may be computationally efficient and scalable as data traffic volume and the number of computing devices communicating over the communication network 820 increase. Therefore, the malicious network content detection system 825 may not become a bottleneck in the computer network system 800.

The communication network 820 may include a public computer network such as the Internet, in which case a firewall 825 may be interposed between the communication network 820 and the client device 830. Alternatively, the communication network may be a private computer network such as a wireless telecommunication network, wide area network, or local area network, or a combination of networks. Though the communication network 820 may include any type of network and be used to communicate different types of data, communications of web data may be discussed below for purposes of example.

The malicious network content detection system 850 is shown as coupled with the network 820 by a network tap 840 (e.g., a data/packet capturing device). The network tap 840 may include a digital network tap configured to monitor network data and provide a copy of the network data to the malicious network content detection system 850. Network data may comprise signals and data that are transmitted over the communication network 820 including data flows from the server device 810 to the client device 830. In one example, the network tap 840 monitors and copies the network data without an appreciable decline in performance of the server device 810, the client device 830, or the communication network 820. The network tap 840 may copy any portion of the network data, for example, any number of data packets from the network data. In embodiments where the malicious content detection system 850 is implemented as an dedicated appliance or a dedicated computer system, the network tap 840 may include an assembly integrated into the appliance or computer system that includes network ports, network interface card and related logic (not shown) for connecting to the communication network 820 to non-disruptively "tap" traffic thereon and provide a copy of the traffic to the heuristic module 860. In other embodiments, the network tap 840 can be integrated into a firewall, router, switch or other network device (not shown) or can be a standalone component, such as an appropriate commercially available network tap. In virtual environments, a virtual tap (vTAP) can be used to copy traffic from virtual networks.

The network tap 840 may also capture metadata from the network data. The metadata may be associated with the server device 810 and/or the client device 830. For example, the metadata may identify the server device 810 and/or the client device 830. In some embodiments, the server device 810 transmits metadata which is captured by the tap 840. In other embodiments, a heuristic module 860 (described herein) may determine the server device 810 and the client device 830 by analyzing data packets within the network data in order to generate the metadata. The term, "content," as used herein may be construed to include the intercepted network data and/or the metadata unless the context requires otherwise.

The malicious network content detection system 850 may include a heuristic module 860, a heuristics database 862, a scheduler 870, a virtual machine pool 880, an analysis engine 882 and a reporting module 884. In some embodiments, the network tap 840 may be contained within the malicious network content detection system 850.

The heuristic module 860 receives the copy of the network data from the network tap 840 and applies heuristics to the data to determine if the network data might contain suspicious network content. The heuristics applied by the heuristic module 860 may be based on data and/or rules stored in the heuristics database 862. The heuristic module 860 may examine the image of the captured content without executing or opening the captured content. For example, the heuristic module 860 may examine the metadata or attributes of the captured content and/or the code image (e.g., a binary image of an executable) to determine whether a certain portion of the captured content matches a predetermined pattern or signature that is associated with a particular type of malicious content. In one example, the heuristic module 860 flags network data as suspicious after applying a heuristic analysis. This detection process is also referred to as a static malicious content detection. The suspicious network data may then be provided to the scheduler 870. In some embodiments, the suspicious network data is provided directly to the scheduler 870 with or without buffering or organizing one or more data flows.

When a characteristic of the packet, such as a sequence of characters or keyword, is identified that meets the conditions of a heuristic, a suspicious characteristic of the network content is identified. The identified characteristic may be stored for reference and analysis. In some embodiments, the entire packet may be inspected (e.g., using deep packet inspection techniques) and multiple characteristics may be identified before proceeding to the next step. In some embodiments, the characteristic may be determined as a result of an analysis across multiple packets comprising the network content. A score related to a probability that the suspicious characteristic identified indicates malicious network content is determined.

The heuristic module 860 may also provide a priority level for the packet and/or the features present in the packet. The scheduler 870 may then load and configure a virtual machine from the virtual machine pool 880 in an order related to the priority level, and dispatch the virtual machine to the analysis engine 882 to process the suspicious network content.

The heuristic module 860 may provide the packet containing the suspicious network content to the scheduler 870, along with a list of the features present in the packet and the malicious probability scores associated with each of those features. Alternatively, the heuristic module 860 may provide a pointer to the packet containing the suspicious network content to the scheduler 870 such that the scheduler 870 may access the packet via a memory shared with the heuristic module 860. In another embodiment, the heuristic module 860 may provide identification information regarding the packet to the scheduler 870 such that the scheduler 870, replayer 805, or virtual machine may query the heuristic module 860 for data regarding the packet as needed.

The scheduler 870 may identify the client device 830 and retrieve a virtual machine associated with the client device 830. A virtual machine may itself be executable software that is configured to mimic the performance of a device (e.g., the client device 830). The virtual machine may be retrieved from the virtual machine pool 880. Furthermore, the scheduler 870 may identify, for example, a Web browser running on the client device 830, and retrieve a virtual machine associated with the web browser.

In some embodiments, the heuristic module 860 transmits the metadata identifying the client device 830 to the scheduler 870. In other embodiments, the scheduler 870 receives one or more data packets of the network data from the heuristic module 860 and analyzes the one or more data packets to identify the client device 830. In yet other embodiments, the metadata may be received from the network tap 840.

The scheduler 870 may retrieve and configure the virtual machine to mimic the pertinent performance characteristics of the client device 830. In one example, the scheduler 870 configures the characteristics of the virtual machine to mimic only those features of the client device 830 that are affected by the network data copied by the network tap 840. The scheduler 870 may determine the features of the client device 830 that are affected by the network data by receiving and analyzing the network data from the network tap 840. Such features of the client device 830 may include ports that are to receive the network data, select device drivers that are to respond to the network data, and any other devices coupled to or contained within the client device 830 that can respond to the network data. In other embodiments, the heuristic module 860 may determine the features of the client device 830 that are affected by the network data by receiving and analyzing the network data from the network tap 840. The heuristic module 850 may then transmit the features of the client device to the scheduler 870.

The virtual machine pool 880 may be configured to store one or more virtual machines. The virtual machine pool 880 may include software and/or a storage medium capable of storing software. In one example, the virtual machine pool 880 stores a single virtual machine that can be configured by the scheduler 870 to mimic the performance of any client device 830 on the communication network 820. The virtual machine pool 880 may store any number of distinct virtual machines that can be configured to simulate the performance of a wide variety of client devices 830.

The analysis engine 882 simulates the receipt and/or display of the network content from the server device 810 after the network content is received by the client device 110 to analyze the effects of the network content upon the client device 830. The analysis engine 882 may identify the effects of malware or malicious network content by analyzing the simulation of the effects of the network content upon the client device 830 that is carried out on the virtual machine. There may be multiple analysis engines 850 to simulate multiple streams of network content. The analysis engine 882 may be configured to monitor the virtual machine for indications that the suspicious network content is in fact malicious network content. Such indications may include unusual network transmissions, unusual changes in performance, and the like. This detection process is referred to as a dynamic malicious content detection.

The analysis engine 882 may flag the suspicious network content as malicious network content according to the observed behavior of the virtual machine. The reporting module 884 may issue alerts indicating the presence of malware, and using pointers and other reference information, identify the packets of the network content containing the malware. Additionally, the server device 810 may be added to a list of malicious network content providers, and future network transmissions originating from the server device 810 may be blocked from reaching their intended destinations, e.g., by firewall 825.

The computer network system 800 may also include a further communication network 890, which couples the malicious content detection system (MCDS) 850 with one or more other MCDS, of which MCDS 892 and MCDS 894 are shown, and a management system 896, which may be implemented as a Web server having a Web interface. The communication network 890 may, in some embodiments, be coupled for communication with or part of network 820. The management system 896 is responsible for managing the MCDS 850, 892, 894 and providing updates to their operation systems and software programs. Also, the management system 896 may cause malware signatures generated by any of the MCDS 850, 892, 894 to be shared with one or more of the other MCDS 850, 892, 894, for example, on a subscription basis. Moreover, the malicious content detection system as described in the foregoing embodiments may be incorporated into one or more of the MCDS 850, 892, 894, or into all of them, depending on the deployment. Also, the management system 896 itself or another dedicated computer station may incorporate the malicious content detection system in deployments where such detection is to be conducted at a centralized resource.

Further information regarding an embodiment of a malicious content detection system can be had with reference to U.S. Pat. No. 8,171,553, the disclosure of which being incorporated herein by reference in its entirety.

As described above, the detection or analysis performed by the heuristic module 860 may be referred to as static detection or static analysis, which may generate a first score (e.g., a static detection score) according to a first scoring scheme or algorithm. The detection or analysis performed by the analysis engine 882 is referred to as dynamic detection or dynamic analysis, which may generate a second score (e.g., a dynamic detection score) according to a second scoring scheme or algorithm. The first and second scores may be combined, according to a predetermined algorithm, to derive a final score indicating the probability that a malicious content suspect is indeed malicious.

Furthermore, detection systems 850 and 892-894 may deployed in a variety of distribution ways. For example, detection system 850 may be deployed as a detection appliance at a client site to detect any suspicious content, for example, at a local area network (LAN) of the client. In addition, any of MCDS 892 and MCDS 894 may also be deployed as dedicated data analysis systems. Systems 850 and 892-894 may be configured and managed by a management system 896 over network 890, which may be a LAN, a wide area network (WAN) such as the Internet, or a combination of both. Management system 896 may be implemented as a Web server having a Web interface to allow an administrator of a client (e.g., corporation entity) to log in to manage detection systems 850 and 892-894. For example, an administrator may able to activate or deactivate certain functionalities of malicious content detection systems 850 and 892-894 or alternatively, to distribute software updates such as malicious content definition files (e.g., malicious signatures or patterns) or rules, etc. Furthermore, a user can submit via a Web interface suspicious content to be analyzed, for example, by dedicated data analysis systems 892-894. As described above, malicious content detection includes static detection and dynamic detection. Such static and dynamic detections can be distributed amongst different systems over a network. For example, static detection may be performed by detection system 850 at a client site, while dynamic detection of the same content can be offloaded to the cloud, for example, by any of detection systems 892-894. Other configurations may exist.

Figure 6:
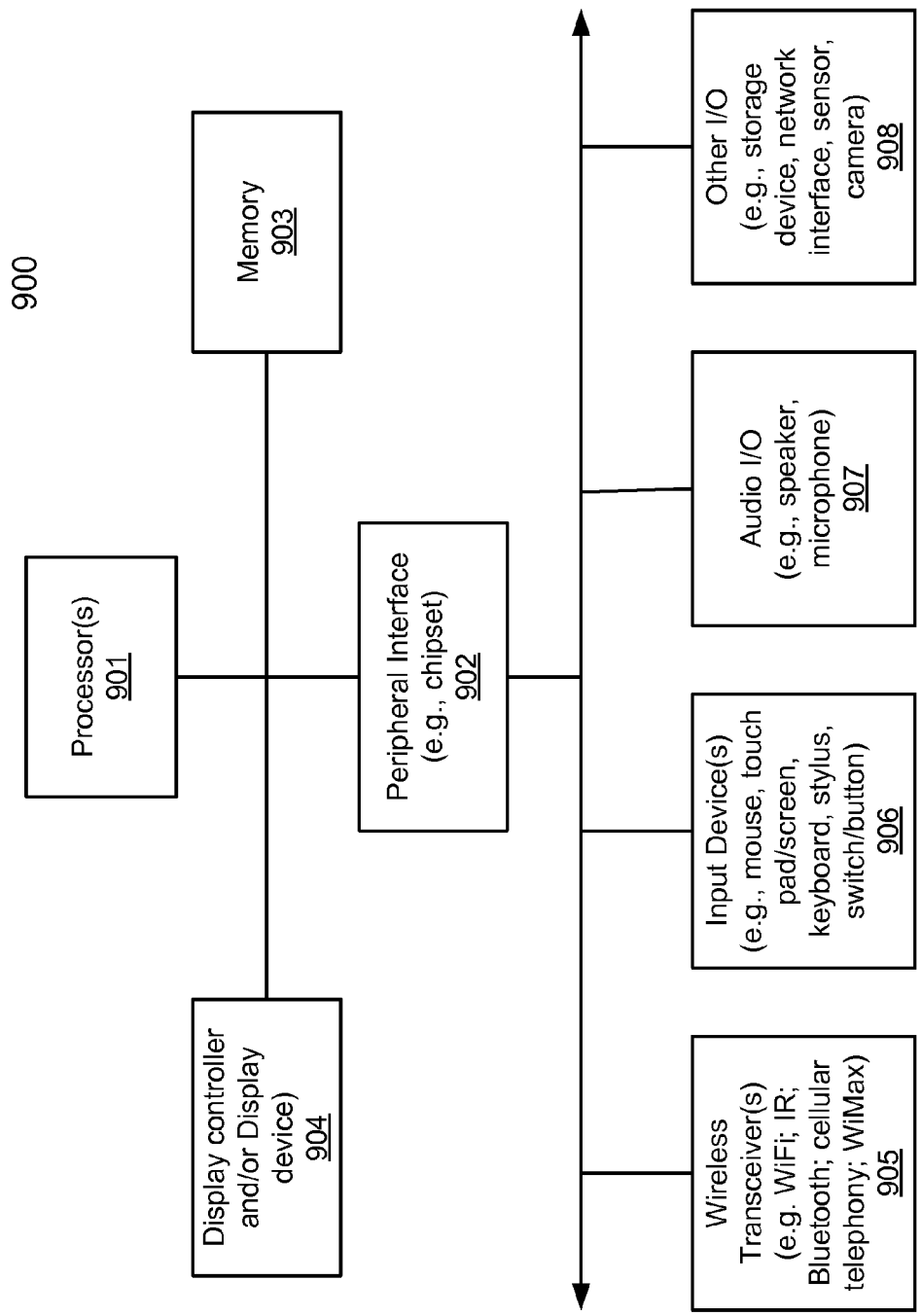
FIG. 6 is a block diagram illustrating an example of a data processing system which may be used with one embodiment of the invention.

FIG. 6 is a block diagram illustrating an example of a data processing system which may be used with one embodiment of the invention. For example, system 900 may represents any of data processing systems described above performing any of the processes or methods described above. System 900 may represent a desktop, a tablet, a server, a mobile phone, a media player, a personal digital assistant (PDA), a personal communicator, a gaming device, a network router or hub, a wireless access point (AP) or repeater, a set-top box, or a combination thereof.

Referring to FIG. 6, in one embodiment, system 900 includes processor 901 and peripheral interface 902, also referred to herein as a chipset, to couple various components to processor 901 including memory 903 and devices 905-908 via a bus or an interconnect. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 901 is configured to execute instructions for performing the operations and steps discussed herein.

Peripheral interface 902 may include memory control hub (MCH) and input output control hub (ICH). Peripheral interface 902 may include a memory controller (not shown) that communicates with a memory 903. Peripheral interface 902 may also include a graphics interface that communicates with graphics subsystem 904, which may include a display controller and/or a display device. Peripheral interface 902 may communicate with graphics device 904 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 901. In such a configuration, peripheral interface 902 operates as an interface chip performing some functions of the MCH and ICH. Furthermore, a graphics accelerator may be integrated within the MCH or processor 901.

Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 902 may provide an interface to IO devices such as devices 905-908, including wireless transceiver(s) 905, input device(s) 906, audio IO device(s) 907, and other IO devices 908. Wireless transceiver 905 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 907 may include a speaker and/or a microphone to facilitate voice-enabled functions, such as voice recognition, voice replication, digital recording, and/or telephony functions. Other optional devices 908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 6 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for detecting malicious content, the method comprising:
monitoring, by a monitoring module executed by a processor, behavior of a malicious content suspect executed within a sandboxed operating environment, the sandboxed operating environment comprises a virtual machine that operates in accordance with an operating environment targeted by the malicious content suspect;
in response to detection of one or more predetermined events from the monitored behavior that are triggered by the malicious content suspect, generating, by a memory dump module, a memory dump associated with the malicious content suspect;
storing, within a storage device, a portion of data associated with the virtual machine, which includes one or more of (i) contents of the memory dump and (ii) the one or more predetermined events, in a directory accessible to a controller that is part of a virtual machine monitor (VMM);
retrieving at least the contents of the memory dump via the directory; and
analyzing, by an analysis module, at least the contents of the memory dump to determine whether the malicious content suspect should be declared as malicious based on a set of one or more rules.

2. The method of claim 1, wherein the memory dump comprises information concerning data accessed by the malicious content suspect, an executable image of the malicious content suspect, and information concerning activities performed by the malicious content suspect during the execution of the malicious content suspect.

3. The method of claim 2, wherein the memory dump further comprises information concerning content embedded within the malicious content suspect that is revealed only through the execution of the malicious content suspect.

4. The method of claim 1, further comprising in response to detection of an event of the one or more predetermined events triggered by the malicious content suspect, transmitting by the monitoring module a message identifying the detected event to the analysis module, wherein the analysis module performs the analysis of the memory dump in view of the message received from the monitoring module.

5. The method of claim 1, further comprising:
transmitting the contents of the memory dump to a remote facility over a network to be analyzed by the remote facility.

6. The method of claim 1, wherein the monitoring module is running within the virtual machine that is hosted by a guest operating system (OS), and wherein the analysis module is running within a host OS that manages the guest OS.

7. The method of claim 1, further comprising retrieving via the directory one or more files that have been accessed by the malicious content suspect during the execution of the malicious content suspect.

8. The method of claim 1, wherein the generating of the memory dump comprises invoking a memory dump utility that is associated with an operating system hosting the sandboxed operating environment to capture information associated with the malicious content suspect from a memory.

9. A non-transitory machine-readable medium storing instructions, which when executed by a processor, cause the processor to perform a method of malicious content detection, the method comprising:
monitoring, by a monitoring module, behavior of a malicious content suspect executed within a sandboxed operating environment, the sandboxed operating environment comprises a virtual machine that operates in accordance with an operating environment targeted by the malicious content suspect;
in response to detection of one or more predetermined events from the monitored behavior that are triggered by the malicious content suspect, generating, by a memory dump module, a memory dump associated with the malicious content suspect;

storing, within a storage device, a portion of data associated with the virtual machine, which includes one ore more (i) contents of the memory dump and (ii) the one or more predetermined events, in a directory accessible to a controller that is part of a virtual machine monitor (VMM);

retrieving at least contents of the memory dump via the directory; and analyzing, by an analysis module, at least the contents of the memory dump to determine whether the malicious content suspect should be declared as malicious based on a set of one or more rules.

10. The medium of claim 9, wherein the memory dump comprises information concerning data accessed by the malicious content suspect, an executable image of the malicious content suspect, and information concerning activities performed by the malicious content suspect during the execution of the malicious content suspect.

11. The medium of claim 10, wherein the memory dump further comprises information concerning content embedded within the malicious content suspect that is revealed only through the execution of the malicious content suspect.

12. The medium of claim 9, wherein the method further comprises in response to detection of an event of the one or more predetermined events triggered by the behavior of the malicious content suspect, transmitting by the monitoring module a message identifying the detected event to the analysis module, wherein the analysis module performs the analysis of the memory dump in view of the message received from the monitoring module.

13. The medium of claim 9, wherein the method further comprises:

transmitting contents of the memory dump to a remote facility over a network to be analyzed by the remote facility.

14. The medium of claim 9, wherein the monitoring module is running within the VM that is hosted by a guest operating system (OS), and wherein the analysis module is running within a host OS that manages the guest OS.

15. The medium of claim 9, wherein the method further comprises retrieving via the directory one or more files that have been accessed by the malicious content suspect during the execution of the malicious content suspect.

16. The medium of claim 9, wherein generating a memory dump comprises invoking a memory dump utility that is associated with an operating system hosting the sandboxed operating environment to capture information associated with the malicious content suspect from a memory.

17. A malicious content detection system, comprising:
a display device;
a display controller communicatively coupled to the display device, the display controller to control the display device;
a processor communicatively coupled to the display controller, the processor is configured to process:
a monitoring module that includes logic to monitor behavior of a malicious content suspect executed within a sandboxed operating environment, the sandboxed operating environment comprises a virtual machine that operates in accordance with an operating environment targeted by the malicious content suspect,
a memory dump module communicatively coupled to the monitoring module, the memory dump includes logic that, in response to detection of one or more predetermined events from the monitored behavior that are triggered by the malicious content suspect, generates a memory dump associated with the malicious content suspect,
a file extractor that includes logic that stores, within a storage device, a portion of data associated with the virtual machine, which includes one or more of (i) contents of the memory dump and (ii) one or more predetermined events, in a directory accessible to a controller that is part of a virtual machine monitor (VMM), and
an analysis module communicatively coupled to the monitoring module and the memory dump module, the analysis module configured to analyze at least the contents of the memory dump to determine whether the malicious content suspect should be declared as malicious based on a set of one or more rules.

18. The system of claim 17, wherein the memory dump comprises information concerning data accessed by the malicious content suspect, an executable image of the malicious content suspect, and information concerning activities performed by the malicious content suspect during the execution of the malicious content suspect.

19. The system of claim 18, wherein the memory dump further comprises information concerning content embedded within the malicious content suspect that is revealed only through the execution of the malicious content suspect.

20. The system of claim 17, wherein the memory dump is generated by invoking a memory dump utility that is associated with an operating system hosting the sandboxed operating environment to capture information associated with the malicious content suspect from the memory.

21. A system, comprising:
a hardware processor; and
a memory communicatively coupled to the hardware processor, the memory comprises one or more virtual machines and a controller that is part of a virtual machine monitor (VMM) and is in communications with the one or more virtual machines,
wherein at least a first virtual machine of the one or more virtual machines comprises
a monitoring module that includes logic to monitor behavior of a malicious content suspect executed within the first virtual machine that operates in accordance with an operating environment targeted by the malicious content suspect, and
a memory dump module communicatively coupled to the monitoring module, the memory dump includes logic that, in response to detection of one or more predetermined events associated with the monitored behavior of the malicious content suspect, generates a memory dump of information associated with the malicious content suspect,
wherein the controller of the VMM comprises
a file extractor that includes logic that stores, within a storage device, a portion of data associated with the virtual machine including one or more of (i) contents of the memory dump and (ii) the one or more predetermined events in a directory accessible to the controller, and
an analysis module communicatively coupled to the monitoring module and the memory dump module that analyzes the contents of the memory dump to determine whether the malicious content suspect should be declared as malicious based on a set of one or more rules.

* * * * *